United States Patent
Thornton et al.

(10) Patent No.: US 7,978,563 B2
(45) Date of Patent: Jul. 12, 2011

(54) METHOD FOR PASSIVE SEISMIC EMISSION TOMOGRAPHY INCLUDING POLARIZATION CORRECTION FOR SOURCE MECHANISM

(75) Inventors: Michael P. Thornton, Houston, TX (US); Leo Eisner, Houston, TX (US)

(73) Assignee: Microseismic, Inc., Houston, TX (US)

( * ) Notice: Subject to any disclaimer, the term of this patent is extended or adjusted under 35 U.S.C. 154(b) by 65 days.

(21) Appl. No.: 12/542,784

(22) Filed: Aug. 18, 2009

(65) Prior Publication Data

US 2011/0044131 A1 Feb. 24, 2011

(51) Int. Cl.
*G01V 1/28* (2006.01)
(52) U.S. Cl. .................. 367/38; 702/14; 702/16
(58) Field of Classification Search .............. 367/38; 702/11, 12, 14, 15, 16
See application file for complete search history.

(56) References Cited

U.S. PATENT DOCUMENTS

| | | | |
|---|---|---|---|
| 5,377,104 A | 12/1994 | Sorrells et al. | |
| 5,771,170 A * | 6/1998 | Withers et al. | 702/14 |
| 7,383,133 B1 * | 6/2008 | Scott | 361/15 |
| 7,663,970 B2 * | 2/2010 | Duncan et al. | 367/38 |

FOREIGN PATENT DOCUMENTS

| | | |
|---|---|---|
| GB | 2439571 A | 1/2008 |
| WO | WO2008033797 A2 | 3/2008 |

OTHER PUBLICATIONS

M.L. Jost, et al., A Student's Guide to and Review of Moment Tensors, Seismological Research Letters, vol. 60, No. 2, Apr.-Jun. 1989.
Author Unknown, "Focal Mechanisms", http://quake.usgs.gov/recenteqs/beachball.htm.
International Search Report and Written Opinion, Application PCT/US2010/44183.
Langston, C., Source Inversion of Seismic Waveforms: The Koyna, India, Earthquakes of Sep. 13, 1967, Bulletin of the Seismological Society of America vol. 71 Feb. 1981 No. 1.

* cited by examiner

*Primary Examiner* — Ian J Lobo
(74) *Attorney, Agent, or Firm* — Richard A. Fagin

(57) ABSTRACT

A method for seismic event mapping includes selecting a plurality of subvolumes representing possible locations of origin of a seismic event in the Earth's subsurface. For each subvolume a plurality of possible directions of motion of subsurface formations is selected. For each subvolume and each possible direction of motion, polarity correction is applied to seismic signals recorded at a plurality of positions proximate a volume of the Earth's subsurface to be evaluated. The polarity correction is based on the direction of motion and the position of each seismic sensor with respect to the subvolume. The recorded, polarity corrected seismic signal recordings are time aligned. The time aligned recordings are summed. A most likely direction of motion and subvolume position are determined based on a selected attribute of the summed, time aligned seismic signals.

7 Claims, 4 Drawing Sheets

METHOD FOR PASSIVE SEISMIC EMISSION TOMOGRAPHY INCLUDING POLARIZATION CORRECTION FOR SOURCE MECHANISM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic data acquisition and processing to image subsurface Earth formation structures. More specifically, the invention relates to methods for acquiring and processing passive seismic data, that is, seismic data acquired without the use of a controllable source.

2. Background Art

Passive seismic emission tomography is a process in which an array of seismic sensors is deployed in a selected pattern on the Earth's surface (or on the water bottom in marine surveys) and seismic energy is detected at the sensors that emanates from various seismic events occurring within the Earth's subsurface. Processing the signals detected by the sensors is used to determine, among other things, the position in the Earth's subsurface at which the various seismic events took place.

Applications for passive seismic emission tomography include, for example, determining the point of origin of microearthquakes caused by movement along geologic faults (breaks in rock layers or formations), movement of fluid in subsurface reservoirs, and monitoring of movement of proppant-filled fluid injected into subsurface reservoirs to increase the effective wellbore radius of wellbores drilled through hydrocarbon-producing subsurface Earth formations ("fracturing"). The latter application, known as "frac monitoring" is intended to enable the wellbore operator to determine, with respect to time, the direction and velocity at which the proppant filled fluid moves through particular subsurface Earth formations.

One particular type of passive seismic emission tomography that has been useful is described in U.S. Patent Application Publication No. 2008/0068929 filed by Duncan et al., the underlying patent application for which is assigned to the assignee of the present invention. A method disclosed in the '929 publication includes detecting seismic signals from within the Earth's subsurface over a time period using an array of seismic sensors. The seismic signals are generated by seismic events within the Earth's subsurface. The method includes transforming seismic signals recorded at selected positions into a domain of possible spatial positions of a source of seismic events. An origin in spatial position and time of at least one seismic event is determined from space and time distribution of at least one attribute of the transformed seismic data. A limitation of the method disclosed in the '929 publication relates to the spatial orientation and radiation pattern of the event giving rise to seismic signals detected at the Earth's surface. Depending on the orientation of the source event, its radiation pattern, and the geometry of the sensor array at the surface, some of the sensors in the array may detect a rarefaction as the initial portion of a detected seismic event. Other sensors in the array may detect a compression as the initial portion of the same event. In such cases, if the polarity of the detected seismic events is not correctly identified with reference to the orientation of the seismic source event, the results may be ambiguous.

Polarization correction techniques for microearthquakes are known in the art. For example, Charles A. Langston, SOURCE INVERSION OF SEISMIC WAVEFORMS: THE KOYNA, INDIA, EARTHQUAKES OF 13 Sep. 1967, Bulletin of the Seismological Society of America, Vol. 71, No. 1 (1981) describes various techniques for identifying the orientation of the source mechanism of earthquakes. Generally, such techniques may be described as follows. A hypocenter of a seismic event in the subsurface is determined from passive seismic data recorded at the surface or in wellbores. A possible mechanism (orientation and displacement) which would result in the measured seismic event is selected, given the located hypocenter. Seismic waveforms (signals) are synthesized for each seismic receiver for the selected event. Such synthesis uses as input the seismic properties of the formations existing between the hypocenter and each seismic sensor. The measured seismic signals from each seismic sensor are compared with the synthesized seismic signals. A different source mechanism is selected, and the synthesis is repeated. The source mechanism that results in the closest match between the synthetic seismic signals and the measured seismic signals is selected as the most likely source mechanism.

The foregoing mechanism determination is impracticable for use in passive seismic techniques such as those used for fluid front monitoring, e.g., those described in the '929 publication. Reasons for such impracticability include that in fracture monitoring, for example, there are multiple seismic events closely spaced in time and position. Further, there are typically large numbers of seismic sensors disposed at the surface for which synthesis would have to be performed.

There exists a need for source event polarization correction of seismic signals for improved seismic event source location determination.

SUMMARY OF THE INVENTION

A method for seismic event mapping according to one aspect of the invention includes selecting a plurality of subvolumes representing possible locations of origin of a seismic event in the Earth's subsurface. For each subvolume a plurality of possible directions of motion of subsurface formations is selected. For each subvolume and each possible direction of motion, polarity correction is applied to seismic signals recorded at a plurality of positions proximate a volume of the Earth's subsurface to be evaluated. The polarity correction is based on the direction of motion and the position of each seismic sensor with respect to the subvolume. The recorded, polarity corrected seismic signal recordings are time aligned. The time aligned recordings are summed. A most likely direction of motion and subvolume position are determined based on a selected attribute of the summed, time aligned seismic signals. The most likely position and direction of motion are displayed.

A method for monitoring movement of a fracture fluid front in the Earth's subsurface according to another aspect of the invention includes pumping fluid into a subsurface formation so as to induce hydraulic fractures therein. Signals recorded by deploying at least one seismic sensor proximate each of a plurality of positions proximate an area of the Earth's subsurface to be surveyed are read. The sensors are configured to generate an electrical or optical signal in response to detected seismic energy. A plurality of subvolumes are selected each representing a possible location of origin of a seismic event in the Earth's subsurface. For each subvolume a plurality of possible directions of motion of subsurface formations is selected. For each subvolume and each possible direction of motion, a polarity correction is applied to the recorded signals. The polarity correction is based on the direction of motion and the position of each seismic sensor with respect to the subvolume. The recorded, polarity corrected seismic signal recordings are time aligned. The time aligned recordings are summed. A most likely direction of motion and subvolume position are determined based on a selected attribute of the summed, time aligned seismic signal. The pumping fluid is continued to induce further fractures in the subsurface formation and the foregoing process is repeated. Each of the most likely directions of motion and subvolume positions are displayed.

Other aspects and advantages of the invention will be apparent from the following description and the appended claims.

DETAILED DESCRIPTION

Figure 1:
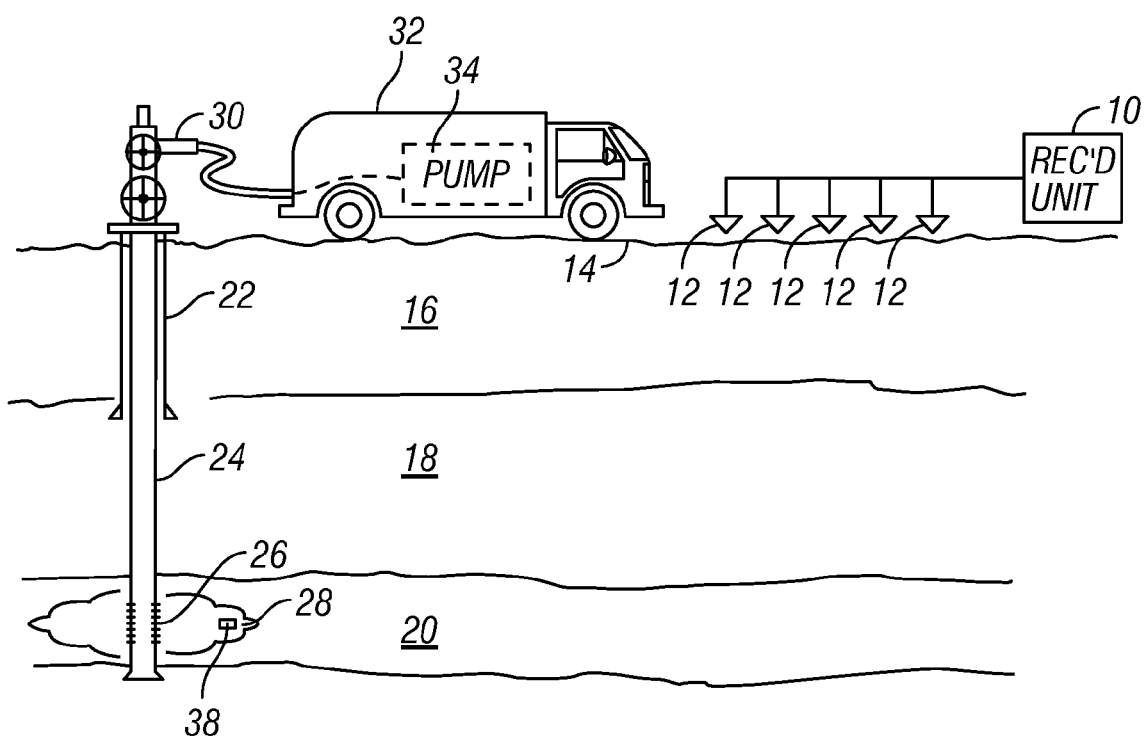
FIG. 1 shows an arrangement of seismic sensors used in a passive seismic method according to one embodiment of the invention associated with frac monitoring.

FIG. 1 shows a typical arrangement of seismic sensors as they would be used in one application of a method according to the invention. The embodiment illustrated in FIG. 1 is associated with an application for passive seismic emission tomography known as "fracture monitoring." It should be clearly understood that the application illustrated in FIG. 1 is only one possible application of a method according to the invention.

In FIG. 1, each of a plurality of seismic sensors, shown generally at 12, is deployed at a selected position proximate the Earth's surface 14. In marine applications, the seismic sensors would typically be deployed on the water bottom in a device known as an "ocean bottom cable." The seismic sensors 12 in the present embodiment may be geophones, but may also be accelerometers or any other sensing device known in the art that is responsive to velocity, acceleration or motion of the particles of the Earth proximate the sensor. The seismic sensors 12 generate electrical or optical signals in response to the particle motion or acceleration, and such signals are ultimately coupled to a recording unit 10 for making a time-indexed recording of the signals from each sensor 12 for later interpretation by a method according to the invention. In other implementations, the seismic sensors 12 may be disposed at various positions within one or more monitor wellbores (not shown) drilled through the subsurface formations. A particular advantage of the method of the invention is that it provides generally useful results when the seismic sensors are disposed at or near the Earth's surface. Surface deployment of seismic sensors is relatively cost and time effective as contrasted with subsurface sensor emplacements. Irrespective of the deployment, the seismic sensors are generally deployed proximate an area or volume of the Earth's subsurface to be evaluated.

In some examples, the seismic sensors 12 may be arranged in sub-groups having spacing therebetween less than about one-half the expected wavelength of seismic energy from the Earth's subsurface that is intended to be detected. Signals from all the sensors in one or more of the sub-groups may be added or summed to reduce the effects of noise in the detected signals.

In the present example, a wellbore 22 is shown drilled through various subsurface Earth formations 16, 18, and through a hydrocarbon producing formation 20. A wellbore tubing or casing 24 having perforations 26 formed therein corresponding to the depth of the hydrocarbon producing formation 20 is connected to a valve set known as a wellhead 30 disposed at the Earth's surface. The wellhead may be hydraulically connected to a pump 34 in a fracture pumping unit 32. The fracture pumping unit 32 is used in the process of pumping a fluid, which in some instances includes selected size solid particles, collectively called "proppant", are disposed. Pumping such fluid, whether propped or otherwise, is known as hydraulic fracturing. The movement of the fluid is shown schematically at the fluid front 28 in FIG. 1. In hydraulic fracturing techniques known in the art, the fluid is pumped at a pressure which exceeds the fracture pressure of the particular producing formation 20, causing it to rupture, and form fissures therein. The fracture pressure is generally related to the pressure exerted by the weight of all the formations 16, 18 disposed above the hydrocarbon producing formation 20, and such pressure is generally referred to as the "overburden pressure." In propped fracturing operations, the particles of the proppant move into such fissures and remain therein after the fluid pressure is reduced below the fracture pressure of the formation 20. The proppant, by appropriate selection of particle size distribution and shape, forms a high permeability channel in the formation 20 that may extend a great lateral distance away from the tubing 24, and such channel remains permeable after the fluid pressure is relieved. The effect of the proppant filled channel is to increase the effective radius of the wellbore 24 that is in hydraulic communication with the producing formation 20, thus substantially increasing productive capacity of the wellbore 24 to hydrocarbons.

The fracturing of the formation 20 by the fluid pressure is one possible source of seismic energy that is detected by the seismic sensors 12. The time at which the seismic energy is detected by each of the sensors 12 with respect to the time-dependent position in the subsurface of the formation fracture caused at the fluid front 28 is related to the acoustic velocity of each of the formations 16, 18, 20, and the position of each of the seismic sensors 12.

It should be noted that the same arrangement of sensors as shown in FIG. 1 may be used to detect naturally occurring seismic energy and the procedure for processing the seismic data will be substantially the same irrespective of whether fracture fluid is pumped.

Having explained one type of passive seismic data that may be used with methods according to the invention, a method for processing such seismic data will now be explained. The seismic signals recorded from each of the sensors 12 may be processed first by certain procedures well known in the art of seismic data processing, including the summing described above, and various forms of filtering. In some embodiments, the sensors 12 may be arranged in directions substantially along a direction of propagation of acoustic energy that may be generated by the pumping unit 32, in the embodiment of FIG. 1 radially outward away from the wellhead 30. By such arrangement of the seismic sensors 12, noise from the pumping unit 32 and similar sources near the wellhead 30 may be attenuated in the seismic signals by frequency-wavenumber (f-k) filtering. Other processing techniques for noise reduction and/or signal enhancement will occur to those of ordinary skill in the art.

Figure 2:
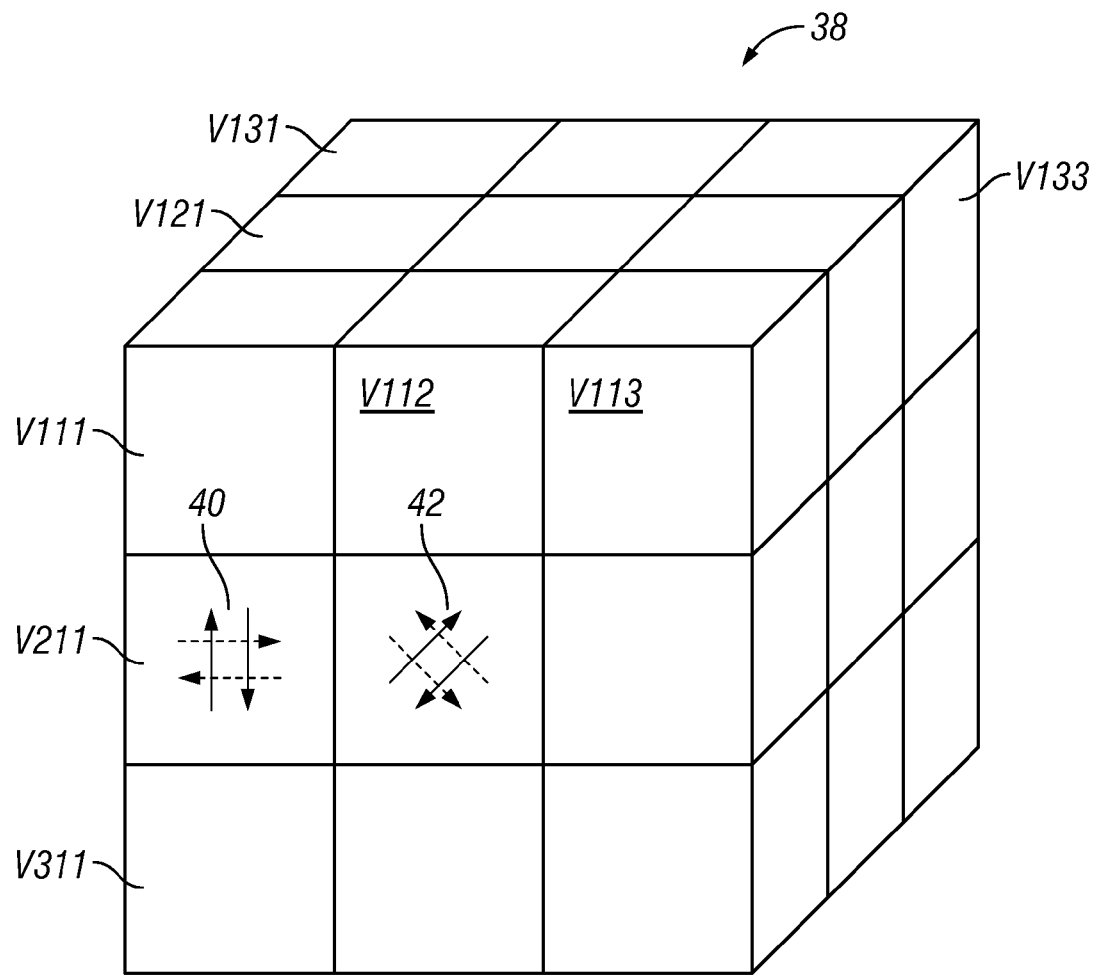
FIG. 2 illustrates an arrangement of a subsurface volume in which various fracture couple orientations are simulated and tested.

The subsurface may be divided into defined subvolumes, each of which represents a possible location of a seismic event (caused, for example, by fluid from the fracture pumping causing a break in the formation). A collection of such subvolumes is identified at 38 in FIG. 1. FIG. 2 shows the example of the defined collection of subvolumes 38 in the subsurface being subdivided into "cells", e.g., those indicated by V111, V211, V311, V112, V113, V121, V131, V133, etc. Each cell can represent a possible position of the origin of a seismic event. For each such cell, a plurality of different possible seismic source event mechanisms (shown as double couple orientations of motion of the rock formations) for example, shown at 40 and 42 may be selected. Although the double couple orientations could be selected for all directions, in practical implementations of the present method the number of possible orientations can be limited by using any available extraneous information. Such information may include, for example, experience in the geographic area of the passive seismic survey or fracturing operation, observation of certain high amplitude seismic events in the recorded seismic data, and/or the existence of subsurface geological features such as faults that would tend to constrain the possible orientation of motion of the formations.

Figure 3:
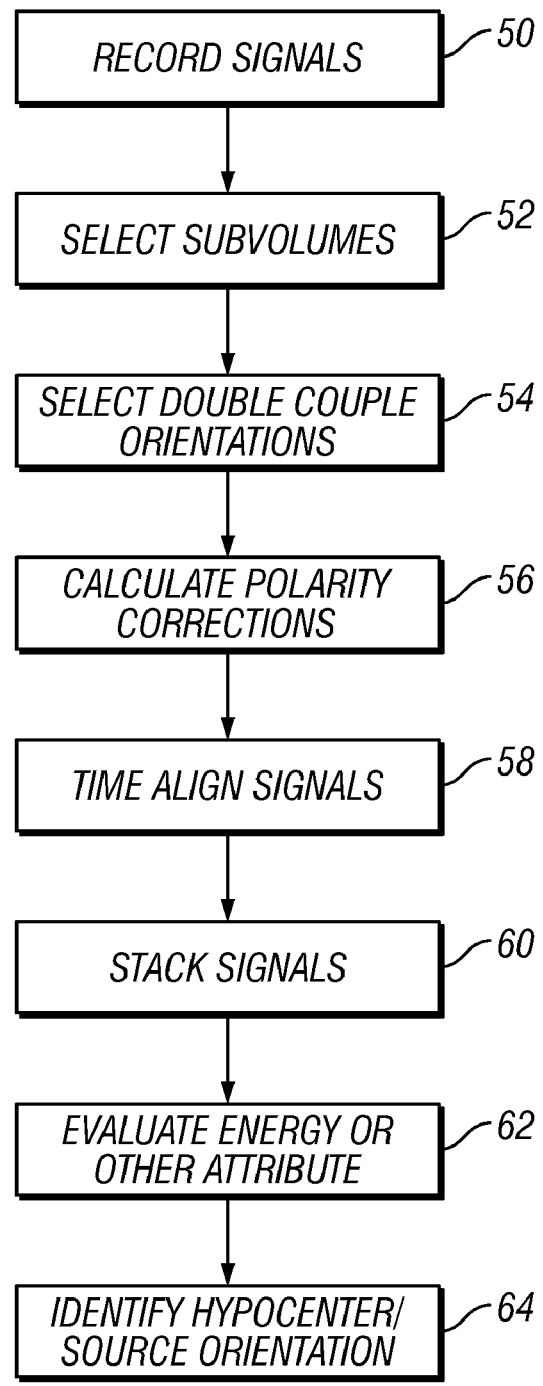
FIG. 3 is a flow chart of one example method of the invention.

Referring to the flow chart in FIG. 3, at 50 the seismic signals are recorded, as explained above. At 52, the cells may be selected as explained with reference to FIG. 2. At 54, a plurality of possible double couple orientations may be selected for each cell, as explained above with reference to FIG. 2.

For each cell, and for each selected double couple orientation, a polarity correction may be calculated, at 56, for each seismic sensor position (see FIG. 1). Such polarity correction will be related to the relative position of each seismic sensor with respect to the position of the cell, and on the particular double couple orientation. The polarity correction includes multiplying each seismic signal by unity or by (−1) depending on which part of the polarity field each particular seismic sensor is disposed. The result is a plurality of polarity corrected seismic signals corresponding to each selected double couple orientation and for each selected cell.

Next, at 58, a time shift is applied to each polarity corrected seismic data recording to remove propagation delay due to travel from the hypocenter (source event position) to the seismic sensor. The time shift will be related to the propagation path from the particular cell to the particular sensor, and the velocities of the formations between the cell and the particular seismic sensor. Applying the time shift will time align microseismic event in all the seismic sensor signals.

Next, at 60, the time aligned seismic signals are summed or stacked to produce a summed estimate of a microseismic event waveform for each cell and for each double couple orientation.

Then, at 62, the energy, amplitude or other attribute of the stacked event recordings can be evaluated for each of the plurality of hypocenter locations and/or source mechanism (double couple) orientation. The hypocenter location and/or source orientation that maximizes one or more focusing attributes may be used as the best estimate of the location and/or orientation of the particular microseismic event, shown at 64.

After application of the polarization correction for the double couple orientation that provides the maximized focusing attribute the recorded seismic signals may be further processed to determine most likely hypocenter(s) of the microseismic event(s). One technique that may be used advantageously is described in the Duncan et al. '929 application publication referred to in the Background of the Invention section herein. Hypocenter locations of microseismic events may be mapped or displayed.

The foregoing procedure may be repeated at selected times during a fracture pumping operation. Each time the procedure is repeated, a possible location of microseismic events may be correlated to movement of the fluid front (28 in FIG. 1), which may be mapped or displayed.

Figure 4:
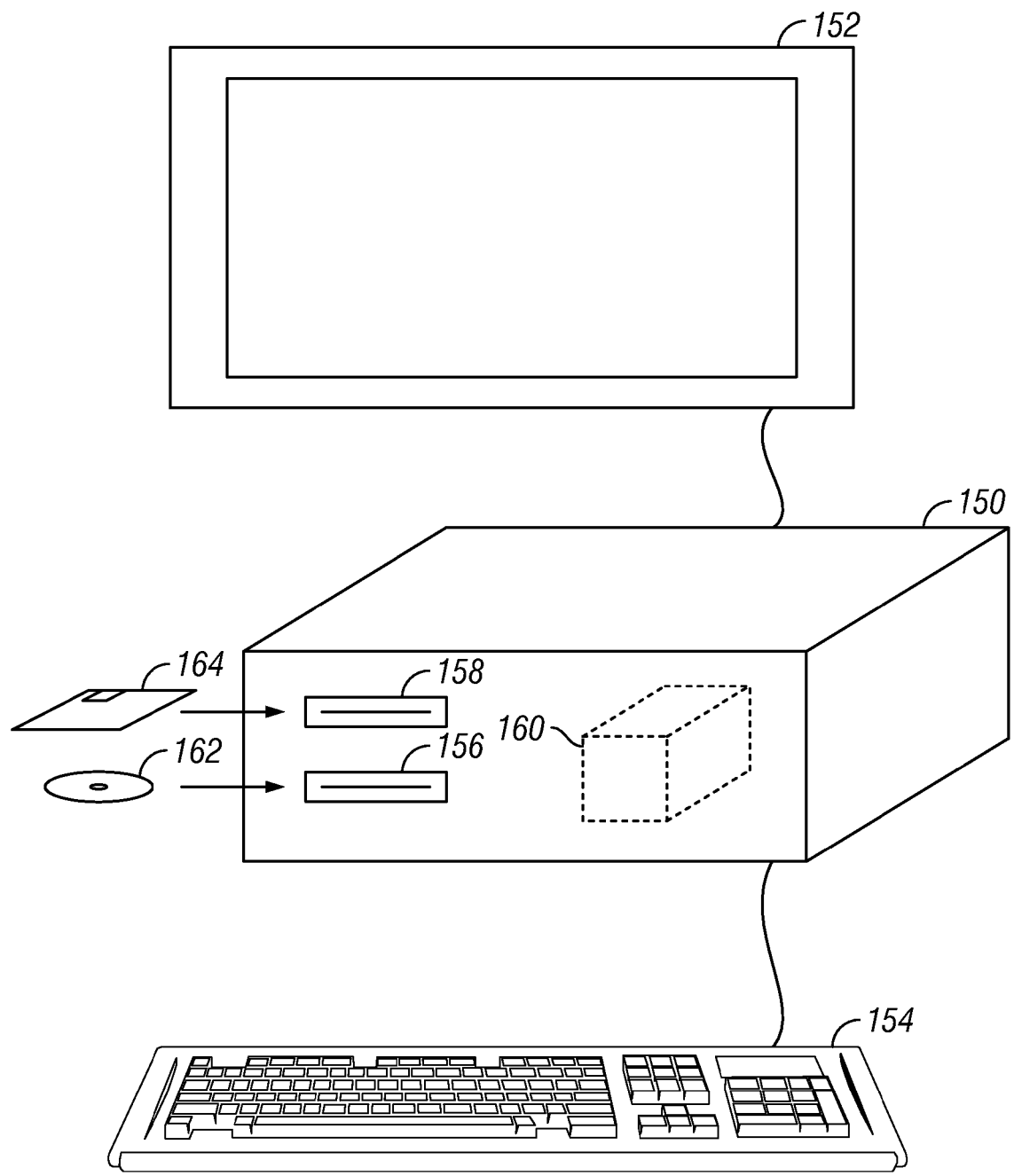
FIG. 4 shows a programmable computer, display and computer readable media.

In another aspect, the invention relates to computer programs stored in computer readable media. Referring to FIG. 4, the foregoing process as explained with reference to FIGS. 1-3, can be embodied in computer-readable code. The code can be stored on a computer readable medium, such as floppy disk 164, CD-ROM 162 or a magnetic (or other type) hard drive 166 forming part of a general purpose programmable computer. The computer, as known in the art, includes a central processing unit 150, a user input device such as a keyboard 154 and a user display 152 such as a flat panel LCD display or cathode ray tube display. The computer may form part of the recording unit (10 in FIG. 1) or may be another computer. According to this aspect of the invention, the computer readable medium includes logic operable to cause the computer to execute acts as set forth above and explained with respect to the previous figures. The user display 152 may also be configured to show hypocenter locations determined as explained above.

Methods according to the present invention may provide better location of hypocenters of microseismic events by assuring that the signals detected at the surface account for polarity of seismic energy generated by the microseismic events.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for seismic event mapping, comprising:
   a) selecting a plurality of subvolumes representing possible locations of origin of a seismic event within a selected volume of the Earth's subsurface;
   b) selecting, for each subvolume a plurality of possible directions of motion of subsurface formations;
   c) for each subvolume and for each possible direction of motion, polarity correcting seismic signals recorded at a plurality of positions proximate the selected volume of the Earth's subsurface, the seismic signals recorded by deploying at least one seismic sensor proximate each position, each sensor configured to generate an electrical or optical signal in response to detected seismic energy, the polarity correction based on the direction of motion and the position of each seismic sensor with respect to the subvolume;
   d) time aligning the recorded, polarity corrected seismic signal recordings;
   e) summing the time aligned recordings;
   f) determining a most likely direction of motion and subvolume position based on a selected attribute of the summed, time aligned seismic signals; and g) displaying the most likely direction of motion and subvolume position.

2. The method of claim 1 wherein the attribute comprises energy.

3. The method of claim 1 further comprising pumping fluid into the Earth's subsurface, and repeating (a) through (g) to identify motion of a fluid front in the Earth's subsurface.

4. A computer program stored in a computer readable medium, the program having logic operable to cause a programmable computer to perform steps comprising:
   a) reading signals recorded by deploying at least one seismic sensor proximate each of a plurality of positions proximate an area of the Earth's subsurface to be surveyed position, the sensors configured to generate an electrical or optical signal in response to detected seismic energy;
   b) selecting a plurality of subvolumes representing possible locations of origin of a seismic event in the Earth's subsurface;
   c) selecting for each subvolume a plurality of possible directions of motion of subsurface formations;
   d) for each subvolume and each possible direction of motion, polarity correcting the recorded signals, the polarity correction based on the direction of motion and the position of each seismic sensor with respect to the subvolume;
   e) time aligning the recorded, polarity corrected seismic signal recordings;
   f) summing the time aligned recordings and
   g) determining a most likely direction of motion and subvolume position based on a selected attribute of the summed, time aligned seismic signals.

5. The computer program of claim 4 wherein the attribute comprises energy.

6. The computer program of claim 4 further comprising pumping fluid into the Earth's subsurface, and repeating (a) through (g) to identify motion of a fluid front in the Earth's subsurface.

7. A method for monitoring movement of a fracture fluid front in the Earth's subsurface, comprising:
   a) pumping fluid into a subsurface formation so as to induce hydraulic fractures therein;
   b) reading signals recorded by deploying at least one seismic sensor proximate each of a plurality of positions proximate an area of the Earth's subsurface to be surveyed position, the sensors configured to generate an electrical or optical signal in response to detected seismic energy;
   c) selecting a plurality of subvolumes representing possible locations of origin of a seismic event in the Earth's subsurface;
   d) selecting for each subvolume a plurality of possible directions of motion of subsurface formations;
   e) for each subvolume and each possible direction of motion, polarity correcting the recorded signals, the polarity correction based on the direction of motion and the position of each seismic sensor with respect to the subvolume;
   f) time aligning the recorded, polarity corrected seismic signal recordings;
   g) summing the time aligned recordings;
   h) determining a most likely direction of motion and subvolume position based on a selected attribute of the summed, time aligned seismic signals;
   j) repeating the pumping fluid to induce further fractures in the subsurface formation and repeating b) through h); and
   k) displaying each of the most likely directions of motion and subvolume positions.

* * * * *